United States Patent
Matsushita

(10) Patent No.: US 12,151,512 B2
(45) Date of Patent: Nov. 26, 2024

(54) PNEUMATIC TIRE

(71) Applicant: The Yokohama Rubber Co., LTD., Tokyo (JP)

(72) Inventor: Kotaro Matsushita, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 324 days.

(21) Appl. No.: 17/597,129

(22) PCT Filed: Jun. 18, 2020

(86) PCT No.: PCT/JP2020/023912
§ 371 (c)(1),
(2) Date: Dec. 27, 2021

(87) PCT Pub. No.: WO2021/002209
PCT Pub. Date: Jan. 7, 2021

(65) Prior Publication Data
US 2022/0242170 A1    Aug. 4, 2022

(30) Foreign Application Priority Data
Jul. 1, 2019   (JP) ................. 2019-122759

(51) Int. Cl.
*B60C 11/03*     (2006.01)
*B60C 11/12*     (2006.01)

(52) U.S. Cl.
CPC ...... *B60C 11/0304* (2013.01); *B60C 11/1204* (2013.01); *B60C 11/1236* (2013.01);
(Continued)

(58) Field of Classification Search
CPC ............ B60C 11/0304; B60C 11/1204; B60C 11/1236; B60C 11/1272;
(Continued)

(56) References Cited

U.S. PATENT DOCUMENTS 5,785,780 A    7/1998  Ochi
2010/0263775 A1  10/2010  Watanabe
(Continued)

FOREIGN PATENT DOCUMENTS

CN    104203603 A    12/2014
CN    106103135 A    11/2016
(Continued)

OTHER PUBLICATIONS

JP-2018065429-A machine translation (Year: 2018).*
WO-2018117024-A1 machine translation (Year: 2018).*
JP 2014162250 machine translation (Year: 2014).*

*Primary Examiner* — Justin R Fischer
*Assistant Examiner* — Wendy L Boss
(74) *Attorney, Agent, or Firm* — Thorpe North & Western

(57) ABSTRACT

A tread pattern of a pneumatic tire includes circumferential grooves extending in a tire circumferential direction and sipes disposed at intervals in the tire circumferential direction in each of land portion regions in contact with the circumferential grooves, the sipes extending in a tire width direction. At least one of the land portion regions includes a first sipe and a second sipe disposed to be adjacent to the first sipe in the tire circumferential direction as the sipe, the sipe region being provided in at least a partial region in the tire width direction. A sipe width of the second sipe is wider than a sipe width of the first sipe. The sipe region is not provided with a lug groove having a wider groove width than the sipe width of the second sipe, the lug groove extending in the tire width direction.

14 Claims, 5 Drawing Sheets

(52) U.S. Cl.
CPC ...... *B60C 11/1259* (2013.01); *B60C 11/1272* (2013.01); *B60C 2011/0348* (2013.01); *B60C 2011/1213* (2013.01)

(58) Field of Classification Search
CPC ..... B60C 2011/0341; B60C 2011/0348; B60C 2011/0388; B60C 2011/1286
See application file for complete search history.

(56) References Cited

U.S. PATENT DOCUMENTS

| | | | |
|---|---|---|---|
| 2015/0041034 A1* | 2/2015 | Matsushita | B60C 11/0304 152/209.24 |
| 2017/0174009 A1 | 6/2017 | Suga | |
| 2017/0190222 A1* | 7/2017 | Suzuki | B60C 11/0306 |
| 2018/0065417 A1 | 3/2018 | Hoshiba | |
| 2020/0016937 A1* | 1/2020 | Koike | B60C 11/1281 |

FOREIGN PATENT DOCUMENTS

| | | |
|---|---|---|
| CN | 107206848 A | 9/2017 |
| DE | 69 511 514 T2 | 3/2000 |
| DE | 10 2010 003 779 A1 | 10/2010 |
| DE | 11 2020 001 922 T5 | 12/2021 |
| JP | H08156525 A | 6/1996 |
| JP | 2010247759 A | 11/2010 |
| JP | 2014162250 A | 9/2014 |
| JP | 5765492 B1 | 6/2015 |
| JP | 2018065429 A * | 4/2018 |
| JP | 2019-073230 A | 5/2019 |
| JP | 2019209872 A | 12/2019 |
| JP | 2020006728 A | 1/2020 |
| WO | WO-2018117024 A1 * | 6/2018 |

* cited by examiner

PNEUMATIC TIRE

TECHNICAL FIELD

The present technology relates to a pneumatic tire.

BACKGROUND ART

All-season tires are required to deliver high performance in a case where traveling on dry road surfaces as well as in a case where traveling on snow-covered road surfaces. In the related art, tires are known that are intended to provide both on-snow performance and steering stability on dry road surfaces in a compatible manner (Japan Patent No. 5765492).

In the tire of Japan Patent No. 5765492, five land portions extending in the tire circumferential direction are formed in the tread surface of a tread portion by four circumferential main grooves extending in the tire circumferential direction, and the land portions include a center land portion, middle land portions, and shoulder land portions. The tire of Japan Patent No. 5765492 includes lug grooves and sipes formed in each of the land portions and intersecting with the tire circumferential direction, and thus has good drainage properties and snow discharge properties and can thus provide on-snow performance. Furthermore, the tire of Japan Patent No. 5765492 independently includes, in each of the middle land portions, first sub grooves including lug grooves each at one end opening in a circumferential main groove and at the other end terminating within the middle land portion; and second sub grooves including lug grooves each at one end opening in a circumferential main groove and the other end terminating within the middle land portion and sipes each at one end opening at the terminating end of the lug groove and the other end terminating within the middle land portion. Thus, the middle land portion is formed as a rib extending continuously in the tire circumferential direction and has increased rigidity, providing steering stability performance on dry road surfaces. As a result, both on-snow performance and steering stability performance on dry road surfaces can be provided in a compatible manner.

In the tires provided with lug grooves in the regions of the land portions, snow column shear force when kicking out snow-covered road surfaces is obtained, resulting in good on-snow performance. On the other hand, pattern noise is large and noise performance tends to deteriorate. However, if lug grooves are removed from the regions of land portions in order to improve the noise performance, the noise performance is improved but there is a problem that the on-snow performance is lowered.

SUMMARY

The present technology improves the noise performance of a pneumatic tire while maintaining at least the on-snow performance.

An aspect of the present technology is a pneumatic tire including a tread pattern in a tread portion, the tread pattern including: a plurality of circumferential grooves extending in a tire circumferential direction; and a plurality of sipes disposed at intervals in the tire circumferential direction in each of a plurality of land portion regions in contact with the circumferential grooves, the sipes extending in a tire width direction, at least one of the land portion regions including a sipe region including a first sipe and a second sipe disposed to be adjacent to the first sipe in the tire circumferential direction as the sipe, the sipe region being provided in at least a partial region in the tire width direction, a sipe width of the second sipe being wider than a sipe width of the first sipe, and the sipe region being not provided with a lug groove having a wider groove width than the sipe width of the second sipe, the lug groove extending in the tire width direction.

A plurality of the second sipes are disposed at intervals in the tire circumferential direction.

Preferably, among the land portion regions, a first land portion region sandwiched between two circumferential grooves adjacent in the tire width direction includes the sipe region, and the sipe in the sipe region is connected to the two circumferential grooves.

Preferably, the sipe in the sipe region of the first land portion region includes a raised bottom portion having a shallower sipe depth than a sipe depth in a central region of the sipe between connection regions, the raised bottom portion being provided in each of the connection regions of the sipes extending in an extension direction of the sipe from a connection end connected to the circumferential groove connected to the sipe, and a depth of the raised bottom portion of the second sipe is deeper than a depth of the raised bottom portion of the first sipe.

Preferably, at least one of two second land portion regions sandwiched between two outer circumferential grooves disposed on an outer side in the tire width direction of the two circumferential grooves sandwiching the first land portion region among the plurality of circumferential grooves and two inner circumferential grooves disposed to be adjacent to the outer circumferential grooves in the tire width direction on an inner side in the tire width direction of the outer circumferential grooves includes the sipe region, and the sipe in the sipe region is connected to the outer circumferential groove or the inner circumferential groove.

Preferably, the land portion region further includes two shoulder land portion regions located on the outer side in the tire width direction of the outer circumferential grooves, the tread pattern further includes a plurality of shoulder lug grooves disposed at intervals in the tire circumferential direction in the shoulder land portion region and extending in the tire width direction, and the shoulder lug groove is connected to the second sipe in the sipe region of the second land portion region via the outer circumferential groove.

Preferably, the second sipe in the sipe region of the second land portion region has a constant sipe depth over an extension direction of the second sipe.

Preferably, a groove width of the outer circumferential groove is narrower than a groove width of the inner circumferential groove.

Preferably, a tire centerline passes through the first land portion region, the tread pattern further includes a plurality of first lug grooves disposed at intervals in the tire circumferential direction in a third land portion region sandwiched between two circumferential grooves, one of which is different from the two circumferential grooves sandwiching the first land portion region among the plurality of circumferential grooves, the first lug grooves extending in the tire width direction, the first lug groove bends at two points so as to project toward both sides in the tire circumferential direction while the first lug groove extends, and an arrangement position of a portion of the first lug groove between two bending positions is close to a circumferential groove located farthest from the tire centerline among the two circumferential grooves sandwiching the third land portion region.

Preferably, the first lug groove includes a raised bottom portion having a shallower groove depth than a region of the first lug groove different from a connection region of the first lug groove, the raised bottom portion being provided in the connection region of the first lug groove extending in an extension direction of the first lug groove from a connection end connected to a circumferential groove located farthest from the tire centerline among the two circumferential grooves sandwiching the third land portion region.

Preferably, the tread pattern specifies a vehicle mounting orientation, and the third land portion region is disposed in a half-tread region facing a vehicle outer side among half-tread regions on both side in the tire width direction with respect to the tire centerline.

Preferably, the tire centerline passes through the first land portion region, a fourth land portion region sandwiched between two circumferential grooves, one of which is different from the two circumferential grooves sandwiching the first land portion region among the plurality of circumferential grooves, includes the sipe region, the fourth land portion region includes the sipe region in a region in the tire width direction in contact with one of the two circumferential grooves, the tread pattern further includes a plurality of second lug grooves disposed at intervals in the tire circumferential direction, the second lug grooves extending from a circumferential groove different from the one circumferential groove among the two circumferential grooves toward inside the fourth land portion region in the tire width direction, the second lug grooves being closed on an outer side of the sipe region, a closed end of the second lug groove is connected to the second sipe in the sipe region, and the second sipe has a constant sipe depth over an extension direction of the second sipe.

Preferably, the tread pattern specifies a vehicle mounting orientation, and the fourth land portion region is disposed in a half-tread region facing a vehicle inner side among half-tread regions on both sides in the tire width direction with respect to the tire centerline.

Preferably, the land portion region includes a first land portion region sandwiched between two circumferential grooves adjacent in the tire width direction among the plurality of circumferential grooves, a third land portion region sandwiched between two circumferential grooves, one of which is different from the two circumferential grooves, and a fourth land portion region sandwiched between two circumferential grooves, one of which is different from the two circumferential grooves sandwiching the first land portion region, the two circumferential grooves different from the two circumferential grooves sandwiching the third land portion region, and in a profile cross-section of the tread portion along the tire width direction, when a reference profile line is an arc which passes through points of two land portion edges at which a tread surface of a land portion of the first land portion region is respectively connected to groove wall surfaces of the two circumferential grooves sandwiching the first land portion region and points of two land portion edges at which tread surfaces of a land portion of the third land portion region and a land portion of the fourth land portion region are respectively connected to groove wall surfaces of the two circumferential grooves, and in which a center point is located on a tire centerline, a profile line created by the tread surfaces of the land portion of the first land portion region, the land portion of the third land portion region, and the land portion of the fourth land portion region is a bulging profile line that projects to an outer side in a tire radial direction with respect to the reference profile line.

Preferably, at least one of the land portion regions includes a plurality of lug grooves disposed at intervals in the tire circumferential direction and extending in the tire width direction, a ratio of an area of the circumferential groove and the lug groove to a ground contact surface of the tread portion is 25 to 30%, a ratio of an area of the circumferential groove to the ground contact surface of the tread portion is 16 to 22%, and a snow traction index STI is 115 to 140, STI being represented by Formula (1):

$$STI=-6.8+2202 \cdot \rho_g+672 \cdot \rho_s+7.6 \cdot D_g \quad (1)$$

(In Formula (1), $\rho_g$ is a value obtained by dividing a total length (mm) of lengths in the tire width direction of all the lug grooves provided in the land portion region when the lug grooves are projected in the tire circumferential direction by (ground contact width of the land portion region)×(circumferential length of the land portion region) (mm²), $\rho_s$ is a value obtained by dividing a total length (mm) of lengths in the tire width direction of all the sipes provided in the land portion region when the sipes are projected in the tire circumferential direction by (ground contact width of the land portion region)×(circumferential length of the land portion region) (mm²), and $D_g$ is an average depth (mm) of the lug grooves provided in the land portion region).

Preferably, a ratio of a sipe width of the second sipe to a sipe width of the first sipe is 1.4 or more.

Preferably, the sipe region does not include the first sipe that is not adjacent to the second sipe in the tire circumferential direction.

According to the present technology, it is possible to improve the noise performance of a pneumatic tire while maintaining at least the on-snow performance.

DETAILED DESCRIPTION

Overall Description of Tire

A pneumatic tire according to an embodiment of the present technology will be described hereinafter.

A pneumatic tire according to an embodiment of the present technology can be filled with air in a cavity region surrounded by a pneumatic tire and a rim, and can also be filled with a gas other than air (e.g. an inert gas such as nitrogen).

Figure 1:
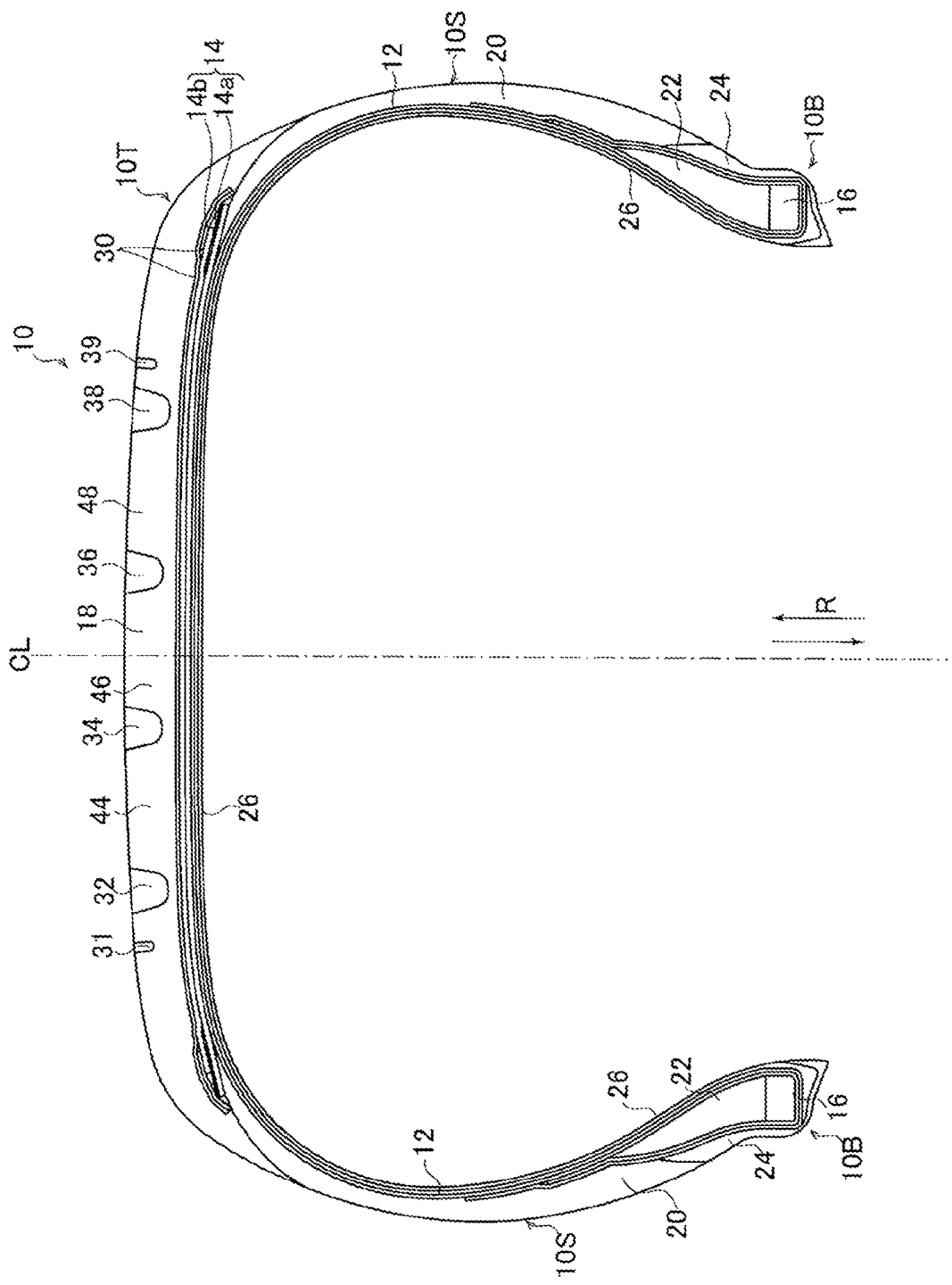
FIG. 1 is a diagram illustrating an example of a profile cross-section of a pneumatic tire.

FIG. 1 is a tire cross-sectional view illustrating a cross-section of a pneumatic tire (hereinafter, referred to as a tire) 10 according to the present embodiment. The present embodiment includes various embodiments described below.

The tire 10 is, for example, a tire for a passenger vehicle. "Tire for a passenger vehicle" refers to a tire specified in Chapter A of the JATMA YEAR BOOK 2012 (standards of the Japan Automobile Tyre Manufacturers Association, Inc.). The tire 10 can also be applied to a tire for a light truck specified in Chapter B and a tire for a truck and a bus specified in Chapter C.

A tire width direction W is a direction parallel to a rotation axis of the tire. An outer side in tire width direction is a side far from a tire centerline CL representing a tire equatorial plane in the tire width direction W. Additionally, an inner side in the tire width direction is a side closer to the tire centerline CL in the tire width direction W. A tire circumferential direction C (see FIG. 2) is the direction of rotation about the rotation axis of the tire. A tire radial direction R is a direction orthogonal to the rotation axis of the pneumatic tire. An outer side in the tire radial direction refers to a side away from the rotation axis. Additionally, an inner side in the tire radial direction refers to a side closer to the rotation axis.

Tire Structure

The tire 10 includes a tread portion 10T including a tread pattern, a pair of bead portions 10B, and a pair of side portions 10S provided in both sides of the tread portion 10T and connecting the pair of bead portions 10B with the tread portion 10T.

The tire 10 includes a carcass ply 12, a belt 14, and a bead core 16 as framework members and mainly includes a tread rubber member 18, side rubber members 20, bead filler rubber members 22, rim cushion rubber members 24, and an innerliner rubber member 26 around the framework members.

The carcass ply 12 is formed of a carcass ply member that is made of organic fibers covered with rubber and wound between a pair of the annular bead cores 16 into a toroidal shape. The carcass ply 12 is wound around the bead cores 16 and extends to an outer side in the tire radial direction. The belt 14 is provided in an outer side of the carcass ply 12 in the tire radial direction and includes two belt members 14a and 14b. The belt 14 includes a member made of a steel cord covered with rubber and arranged at a predetermined inclination angle, for example, at from 20 to 30 degrees with respect to the tire circumferential direction. The belt member 14a that is a lower layer has a greater width in the tire width direction than the width of the belt member 14b that is an upper layer. The steel cords of the two belt members 14a and 14b are inclined in opposite directions. As such, the belt members 14a and 14b are crossing layers serving to suppress expansion of the carcass ply 12 due to the pressure of the air in the tire.

The tread rubber member 18 is provided in an outer side of the belt 14 in the tire radial direction. The side rubber members 20 are connected to both end portions of the tread rubber member 18 and form the side portions 10S. The rim cushion rubber members 24 are respectively provided at ends on inner sides of the side rubber members 20 in the tire radial direction and come into contact with a rim on which the tire 10 is mountable. Each of the bead filler rubber members 22 is provided in an outer side of each of the bead cores 16 in the tire radial direction and is interposed between a portion of the carcass ply 12 prior to being wound around the bead core 16 and a portion of the carcass ply 12 wound around the bead core 16. The innerliner rubber member 26 is provided on the inner surface of the tire 10 facing a tire cavity region that is filled with air and is surrounded by the tire 10 and the rim.

In addition, two belt covers 30 made of organic fiber covered with rubber are provided between the belt member 14b and the tread rubber member 18, and the two belt covers 30 cover the belt 14 from the outer side of the belt 14 in the tire radial direction.

Tread Pattern

Figure 2:
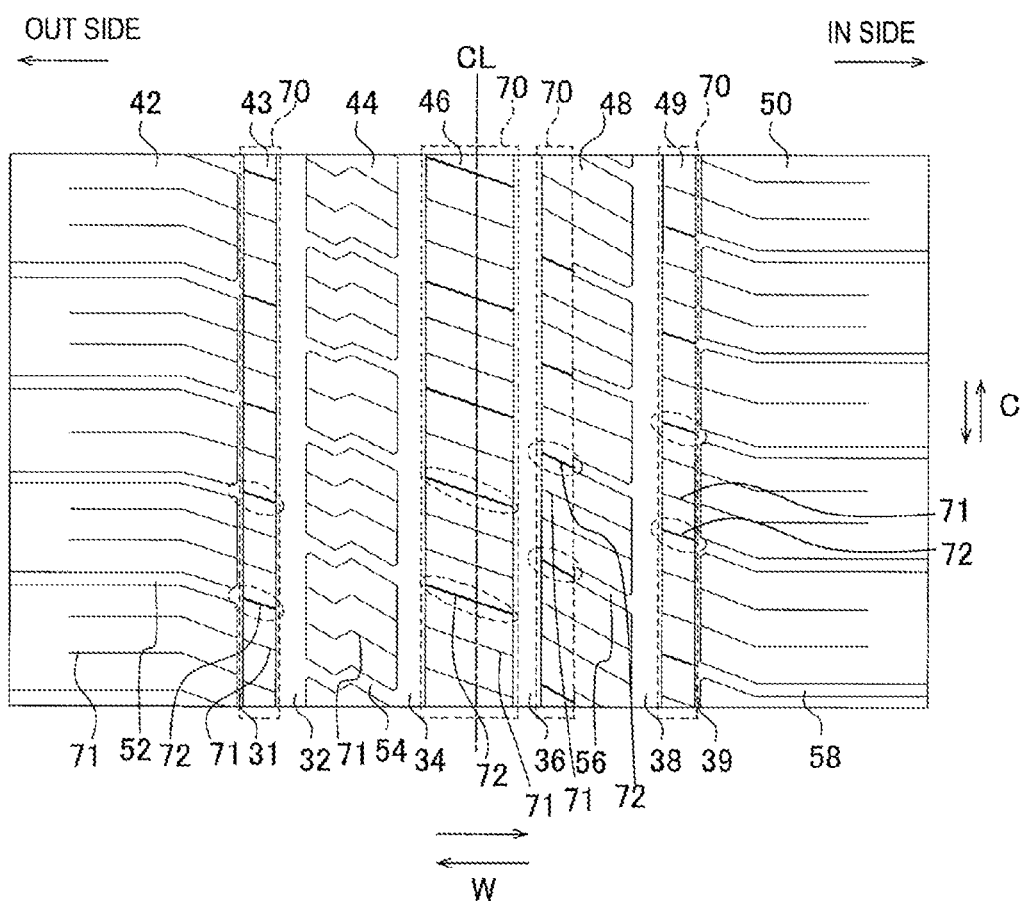
FIG. 2 is a diagram illustrating an example of a tread pattern of a pneumatic tire.

FIG. 2 is a diagram illustrating an example of the tread pattern of the tire 10 of FIG. 1. The tire 10 having the tread pattern illustrated in FIG. 2 is mounted such that one side (right side in FIG. 2) in the tire width direction faces a vehicle inner side (IN side) with respect to the tire centerline CL, and the other side (left in FIG. 2) faces a vehicle outer side (OUT side). However, the tire 10 may be mounted such that the one side faces the vehicle outer side (OUT side) and the other side faces the vehicle inner side (IN side).

The tread pattern illustrated in FIG. 2 includes: a first narrow groove 31, a first shoulder side main groove 32, a first center side main groove 34, a second center side main groove 36, a second shoulder side main groove 38, and a second narrow groove 39 disposed in this order from the left to the right in FIG. 2, as a plurality of circumferential grooves extending in the tire circumferential direction.

The narrow grooves 31 and 39 have a narrower groove width than the main grooves 32, 34, 36, and 38. Additionally, the narrow grooves 31 and 39 have a smaller groove depth than the main grooves 32, 34, 36, and 38.

The first narrow groove 31, the first shoulder side main groove 32, and the first center side main groove 34 are disposed at intervals on the other side (OUT side) in the tire width direction with respect to the tire centerline CL. The first narrow groove 31 is located farthest from the tire centerline CL on the other side in the tire width direction.

The second narrow groove 39, the second shoulder side main groove 38, and the second center side main groove 36 are disposed at intervals on one side (IN side) in the tire width direction with respect to the tire centerline CL. The second narrow groove 39 is located farthest from the tire centerline CL on one side in the tire width direction.

The tread pattern illustrated in FIG. 2 includes the following land portion region in contact with the circumferential groove.

A first shoulder land portion region 42 is disposed on an outer side of the first narrow groove 31 in the tire width direction.

A first narrow land portion region (second land portion region) 43 is located in a region sandwiched between the first narrow groove 31 and the first shoulder side main groove 32.

A first middle land portion region (third land portion region) 44 is located in a region sandwiched between the first shoulder side main groove 32 and the first center side main groove 34.

A center land portion region (first land portion region) 46 is located in a region sandwiched between the first center side main groove 34 and the second center side main groove 36. The tire centerline CL passes through the center land portion region 46.

A second middle land portion region (fourth land portion region) 48 is disposed in a region sandwiched between the second center side main groove 36 and the second shoulder side main groove 38.

A second narrow land portion region (second land portion region) 49 is disposed in a region sandwiched between the second shoulder side main groove 38 and the second narrow groove 39.

A second shoulder land portion region 50 is disposed on an outer side in the tire width direction of the second narrow groove 39.

The tread pattern illustrated in FIG. 2 includes a plurality of sipes disposed at intervals in the tire circumferential direction and extending in the tire width direction in each of the seven land portion regions 42, 43, 44, 46, 48, 49, and 50.

Of these, the land portion regions 43, 46, 48, and 49 are sipe regions (areas surrounded by a dashed line of reference sign 70, hereinafter, described as a sipe region 70) having a first sipe 71 and a second sipe 72 as the sipe. Two of the second sipes 72 disposed at the pitch length of each of the land portion region 43, 46, 48, and 49 in each of the sipe regions 70 are illustrated in the dashed line of the ellipse illustrated in FIG. 2.

A plurality of the first sipes 71 and a plurality of the second sipes 72 are disposed at intervals in the tire circumferential direction. The first sipe 71 and the second sipe 72 are disposed so as to be adjacent in the tire circumferential direction.

In the example illustrated in FIG. 2, the sipes of the land portion regions 43, 46, 48, and 49 extend at an inclination with respect to the tire width direction, and for the sipes of the land portion regions 42, 50, the regions thereof on the inner side of the tire width direction extend at an inclination with respect to the tire width direction.

The sipe width of the second sipe 72 is greater than the sipe width of the first sipe 71. The sipe width of the second sipe 72 is, for example, 0.6 mm or more and less than 1.5 mm, and the sipe width of the first sipe is, for example, 0.3 to 1.2 mm. Preferably, the sipe width of the second sipe 72 is 0.8 to 1.4 mm, and the sipe width of the first sipe 71 is 0.4 mm or more and less than 0.8 mm.

The sipe width of the second sipe 72 is smaller than the groove width of lug grooves 52, 54, 56, and 58. The sipe width of the second sipe 72 is narrower than the groove width of the narrow grooves 31 and 39.

The sipes in the region other than the sipe region 70 are the first sipe 71 or a sipe in which the first sipe 71 in the sipe region 70 is extended.

The first sipe 71 of the second middle land portion region 48 is extended and extends within the region other than the sipe region.

The sipes in the shoulder land portion regions 42 and 50 are extended such that the first sipes 71 of the narrow land portion regions 43 and 49 extend so as to intersect the narrow grooves 31 and 39.

The first sipe 71 in the first middle land portion region 44 bends and extends along the first lug groove 54, which will be described later.

In the first shoulder land portion region 42, a plurality of the first shoulder lug grooves 52 that are disposed at intervals in the tire circumferential direction and extend in the tire width direction are disposed. The first shoulder lug groove 52 terminates by being connected to the first narrow groove 31. The first shoulder lug groove 52 bends in the middle of the extension direction.

In the first middle land portion region 44, a plurality of the first lug grooves 54 that are disposed at intervals in the tire circumferential direction and extend in the tire width direction are disposed. The first lug groove 54 is connected to the main grooves 32 and 34 and extends through the first middle land portion region 44 in the tire width direction. The first lug groove 54 bends at two points so as to project toward both sides in the tire circumferential direction while the first lug groove 54 extends.

In the second middle land portion region 48, a plurality of the second lug grooves 56 which are disposed at intervals in the tire circumferential direction, extend from the second shoulder side main groove 38 toward inside the second middle land portion region 48 in the tire width direction, and are closed on an outer side of the sipe region 70 are disposed.

In the second shoulder land portion region 50, a plurality of the second shoulder lug grooves 58 which are disposed at intervals in the tire circumferential direction and extend in the tire width direction are disposed. The second shoulder lug groove 58 terminates by being connected to the second narrow groove 39. The second shoulder lug groove 58 bends in the middle of the extension direction.

In the present specification, the lug groove means a groove having a groove width of 1.5 mm or more. The groove width of the lug groove is, for example, 2 to 4 mm.

The first narrow land portion region 43, the center land portion region 46, and the second narrow land portion region 49 are not provided with lug grooves extending in the tire width direction.

The sipe region 70 is not provided with lug grooves having a groove width greater than the sipe width of the second sipe 72 and extending in the tire width direction. As described above, if the lug groove is removed from the land portion region, the noise performance is improved, but the snow column shear force is not obtained and the on-snow performance deteriorates. Here, a sipe may be provided in the land portion region instead of the lug groove to supplement the on-snow performance with the effect (edge effect) that the edges of a land portion scratch the road surfaces. However, the sipes are likely to be closed in the ground contact surface and the effect of supplementing the on-snow performance is not sufficient. In the tire 10 of the present embodiment, since the second sipe 72 in the sipe region 70 has a wider sipe width than the first sipe 71, the second sipe 72 is not easily closed in the ground contact surface and the edge effect is easily obtained.

When provided with the lug grooves, a block or a portion of the land portion that has become a block-shaped portion is generally likely to move such that each part of the block contracts toward the center of the block when it touches the ground. Therefore, sipes disposed between the lug grooves adjacent in the tire circumferential direction are likely to be closed in the ground contact surface. Therefore, it is difficult to obtain the edge effect of sipes. However, in the tire 10 of the present embodiment, the second sipe 72 instead of the lug groove is disposed to be adjacent to the first sipe 71 in the tire circumferential direction in the sipe region 70. Therefore, the movement of the block that contracts when it touches the ground is suppressed as compared with the case where the lug groove is provided, and the first sipe 71 is not easily closed as compared with the case where the sipe 71 is disposed between the lug grooves. Therefore, the edge effect of the first sipe 71 is easily obtained.

As described above, in the sipe region 70, the edge effect of the second sipe 72 and the first sipe 71 is easily obtained, and at least the on-snow performance (steering stability on snow-covered road surfaces) is maintained as compared with the case where the lug groove is provided in place of the second sipe 72.

Moreover, since the second sipe 72 has little effect on the pattern noise, the noise performance can be improved as compared with the lug groove. That is, according to the tire 10, the noise performance can be improved while at least maintaining the on-snow performance.

According to one embodiment, the ratio of the sipe width of the second sipe 72 to the sipe width of the first sipe 71 is preferably 1.2 to 3.0, more preferably 1.4 to 2.5. Due to this, the edge effect of the second sipe 72 and the first sipe 71 is sufficiently obtained, and the on-snow performance is improved.

According to one embodiment, as in the example illustrated in FIG. 2, the center land portion region 46 preferably includes the sipe region 70. It is preferable that the sipe region 70 is located in all the regions in the tire width direction of the center land portion region 46, and the sipe in the sipe region 70 is connected to the main grooves 34 and 36. Since the center land portion region 46 has a high ground pressure and has a large influence on the on-snow performance and the noise performance, when the sipe region 70 is provided in the center land portion region 46, the effect of improving the noise performance is increased while at least maintaining the on-snow performance.

Figure 3:
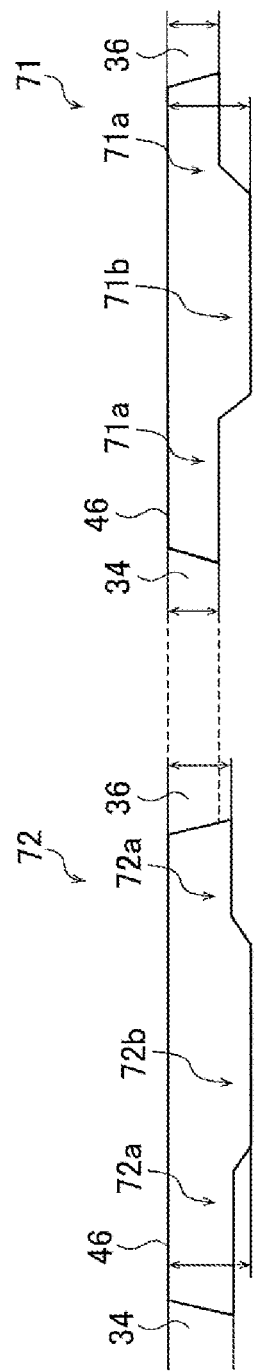
FIG. 3A is a diagram illustrating an example of a profile cross-section of a second sipe.
FIG. 3B is a diagram illustrating an example of a profile cross-section of a first sipe.

FIG. 3A is a diagram illustrating an example of a profile cross-section of the second sipe 72, and FIG. 3B is a diagram illustrating an example of the profile cross-section of the first sipe 71.

According to one embodiment, as illustrated in FIGS. 3A-3B, the sipe 71 and 72 in the sipe region 70 of the center land portion region 46 each preferably include a raised bottom portion whose sipe depth is shallower than the sipe depth of central regions 71b and 72b of the sipe 71 and 72 between connection regions 71a and 72a, the raised bottom portion provided in each of the two connection regions 71a and 72a of the sipes 71 and 72 extending in the extension direction of the sipe from the connection ends connected to the main grooves 34 and 36. The height of the raised bottom portion is lower than the tread surface and is located on the inner side in the tire radial direction. Due to this, the rigidity of the sipe region 70 is ensured.

Further, according to one embodiment, the depth of the raised bottom portion of the second sipe 72 is preferably deeper than the depth of the raised bottom portion of the first sipe 71. Due to this, the on-snow performance when the tire 10 is worn is improved. The depth of the raised bottom portion of the sipes 71 and 72 is preferably 50 to 80% of the groove depth of the main groove 34 or the main groove 36. According to one embodiment, it is preferable that the sipe depth of the central region 72b of the second sipe 72 is equal to the sipe depth of the central region 71b of the first sipe 71. The difference in the amount of collapse of a portion of the land portion between sipes adjacent in the tire circumferential direction is reduced, and the edge effect of the first sipes 71 and the second sipes 72 is likely to be maintained when worn.

According to one embodiment, it is preferable that the narrow land portion regions 43 and 49 each include the sipe region 70. Further, according to one embodiment, it is preferable that the entire region of the narrow land portion regions 43 and 49 is the sipe region 70, and the sipes 71 and 72 in the sipe region 70 of the narrow land portion region 43 are connected to the main groove 32 and the narrow groove 31, and the sipes 71 and 72 in the sipe region 70 of the narrow land portion region 49 are connected to the main groove 38 and the narrow groove 39. Since the narrow land portion regions 43 and 49 are loaded during turning, it is preferable that the narrow land portion regions 43 and 49 do not have a lug groove extending in the tire width direction from the viewpoint of ensuring rigidity against the lateral force. Since the sipe region 70 is provided in the narrow land portion regions 43 and 49, the rigidity against the lateral force is ensured, and the on-snow performance particularly during turning is improved.

According to one embodiment, as described above, the shoulder land portion regions 42 and 50 preferably have shoulder lug grooves 52 and 58. The on-snow performance is improved by the snow column shear force due to the shoulder lug grooves 52 and 58. Further, according to one embodiment, it is preferable that the ends in the extension direction of the shoulder lug grooves 52 and 58 are connected to the second sipes 72 in the narrow land portion regions 43 and 49 via the narrow grooves 31 and 39. Since a portion of the land portions on both sides of the second sipe 72 in the tire circumferential direction moves so as to be shifted in the tire width direction, the snow columns in the shoulder lug grooves 52 and 58 are easily compacted, and the snow column shear force due to the shoulder lug grooves 52 and 58 is improved. Since the shoulder lug grooves 52 and 58 do not communicate with the main grooves 32 and 38 and terminate on outer sides of the main grooves 32 and 38 in the tire width direction, the noise performance of the tire 10 is improved.

According to one embodiment, it is preferable that the second sipe 72 in the sipe region 70 of the narrow land portion regions 43 and 49 has a constant sipe depth over the extension direction of the second sipe 72. Since the narrow land portion regions 43 and 49 have a short length in the tire width direction, if a raised bottom portion is provided in the second sipe 72, the edge effect of the sipe 71 and 72 may not be sufficiently obtained. The length in the tire width direction of the narrow land portion regions 43 and 49 is shorter than the length in the tire width direction of the land portion region 46, 44, 48, 42, and 50.

According to one embodiment, the groove widths of the narrow grooves (outer circumferential grooves) 31 and 39 are preferably narrower than the groove widths of the main grooves (inner circumferential grooves) 32 and 38, as described above. When the groove widths of the narrow grooves 31 and 39 are wide, since the area of the tread surface of the shoulder land portion regions 42 and 50 is small and the rigidity is lowered, the blocks of the shoulder land portion regions 42 and 50 are likely to collapse and are likely to slide against snow-covered road surfaces. Therefore, the noise performance due to the sliding noise is likely to deteriorate.

According to one embodiment, as described above, the first middle land portion region (third land portion region) 44 preferably includes the first lug groove 54. The on-snow performance is improved by the snow column shear force due to the first lug groove 54. In this case, according to one embodiment, it is preferable that the arrangement position of the portion of the first lug groove 54 between the two bending positions is on the main groove 32 side of the main grooves 32 and 34, that is, closest to the main groove 32. Since the bent first lug groove 54 can secure the groove area without being greatly inclined with respect to the tire width direction, it is possible to suppress a decrease in block rigidity of the first middle land portion region 44. Therefore, high on-snow performance can be maintained, and deterioration of noise performance due to the block collapsing and sliding on the snow-covered road surfaces can be suppressed. According to one embodiment, the first middle land portion region 44 preferably does not include another lug groove extending in the tire width direction from the viewpoint of not degrading the noise performance. Further, according to one embodiment, it is preferable that the first middle land portion region 44 does not include the second sipe 72 because the snow column shear force due to the first lug groove 54 is obtained.

Figure 4:
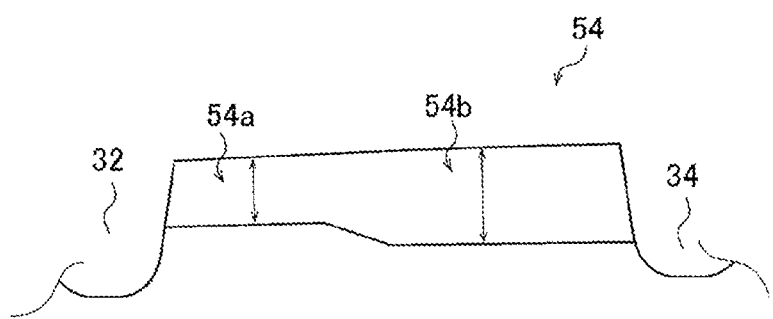
FIG. 4 is a diagram illustrating an example of a profile cross-section of the first lug groove.

FIG. 4 is a diagram illustrating an example of a profile cross-section of the first lug groove 54.

According to one embodiment, as illustrated in FIG. 4, the first lug groove 54 preferably includes a raised bottom portion whose groove depth is shallower than that of region 54b of the first lug groove 54, the region 54b different from connection region 54a, the raised bottom portion provided in the connection region 54a of the first lug groove 54 extending along the extension direction of the first lug groove 54 from the connection end connected to the main groove 32.

In particular, when the tire 10 is mounted so that the first middle land portion region 44 faces the OUT side, since the groove volume is reduced in the connection region 54a located on the outer side in the tire width direction, the pattern noise can be reduced and the noise performance can be further improved. The connection region 54a is preferably located up to the bending position located on the outer side in the tire width direction among the two bending positions. Therefore, according to one embodiment, it is preferable that the tread pattern designates a vehicle mounting orientation, and the first middle land portion region 44 is disposed in a half-tread region facing the vehicle outer side among the half-tread regions on both sides in the tire width direction with respect to the tire centerline CL. According to this embodiment, since the first middle land portion region 44 in which the rigidity is ensured is located on the OUT side, the on-snow performance during turning is improved.

According to one embodiment, as described above, the second middle land portion region (fourth land portion region) 48 preferably includes the second lug groove 56. The snow column shear force due to the second lug groove 56 is obtained, and the on-snow performance is improved. Further, according to one embodiment, it is preferable that the second middle land portion region 48 includes the sipe region 70 in region in the tire width direction in contact with the main groove 36, and the closed end of the second lug groove 56 is connected to the second sipe 72 in the sipe region 70, and the second sipe 72 has a constant sipe depth over the extension direction of the second sipe 72. The snow column shear force due to the main groove contributes to improvement in on-snow performance when turning. The lateral force applied to the land portion region during turning is larger as it is located closer to a region on the outer side in the tire width direction where the load during turning is large. Therefore, since the second lug groove 56 is connected to the main groove 38 as described above, the effect of reinforcing the snow column formed by the main groove 38 is obtained, and the on-snow performance during turning is improved. Since the second lug groove 56 is closed in the second middle land portion region 48, the noise performance can be improved. The closed second lug groove 56 contributes to increasing the ground contact area near the tire centerline CL and improving the steering stability due to the adhesion friction.

According to one embodiment, the first middle land portion region 44 preferably does not include another lug groove extending in the tire width direction from the viewpoint of enhancing noise performance.

According to one embodiment, it is preferable that the tread pattern designates the vehicle mounting orientation, and the second middle land portion region 48 is disposed in a half-tread region facing the vehicle inner side. Since the second middle land portion region 48 having the second lug groove 56 is disposed on the IN side, the effect of improving the noise performance is increased.

Figure 5:
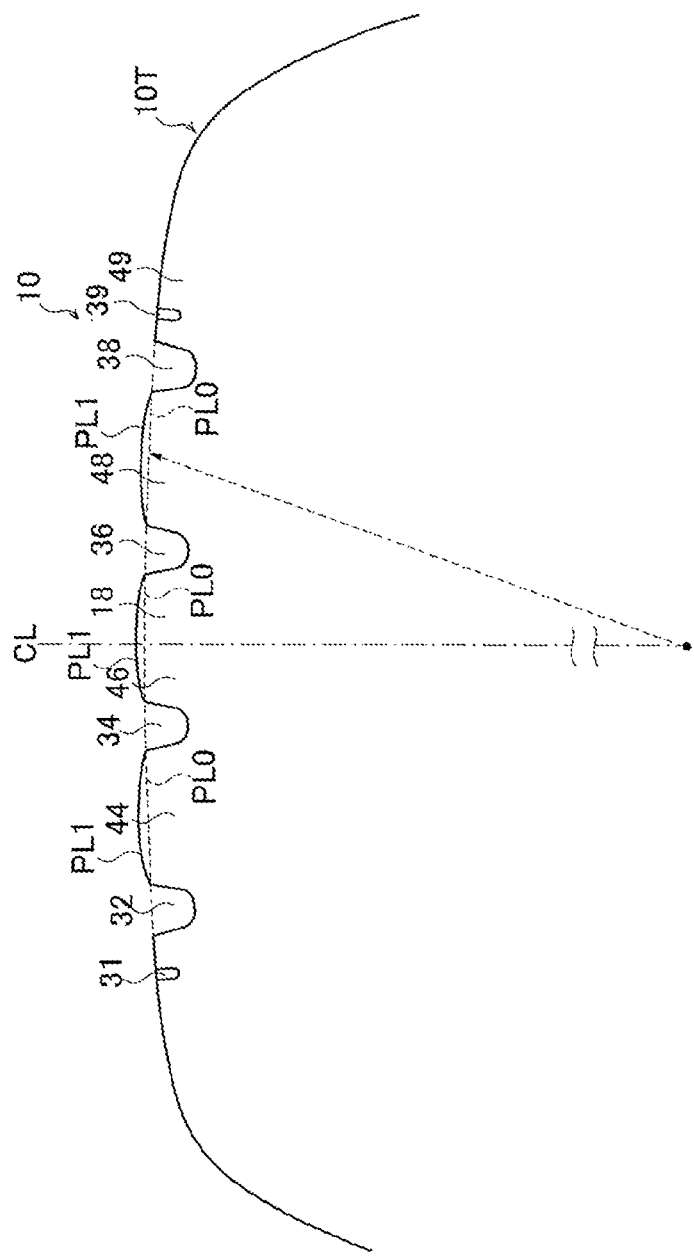
FIG. 5 is a diagram illustrating the profile cross-section of FIG. 1 focusing on a projection portion.

According to one embodiment, a profile line created by respective tread surfaces of the land portion of the center land portion region 46, the land portion of the first middle land portion region 44, and the land portion of the second middle land portion region 48 is preferably a bulging profile line that projects to the outer side in the tire radial direction with respect to a reference profile line illustrated below. FIG. 5 is a diagram illustrating a bulging profile line.

A reference profile line PL0 illustrated in FIG. 5, in a profile cross-section of the tread portion 10T along the tire width direction, is an arc line which passes through: the points of two land portion edges at which the tread surface of the land portion of the center land portion region 46 is respectively connected to groove wall surfaces of the main grooves 34 and 36; and the points of two land portion edges at which the tread surfaces of the land portion of the first middle land portion region 44 and the land portion of the second middle land portion region 48 are respectively connected to groove wall surfaces of the main grooves 34 and 36, and in which the center point is located on the tire centerline CL. The arc line preferably further passes through the points of two land portion edges at which the tread surfaces of the land portion of the first middle land portion region 44 and the land portion of the second middle land portion region 48 are respectively connected to groove wall surfaces of the main grooves 32 and 38.

Since the arc is uniquely determined by the three points through which the arc passes, the arc may not accurately pass through the points of the four land portion edges or the points of six land portion edges. In this case, an arc line in which the total of the separation distances of the point from the arc is within a predetermined range may be set as the reference profile line PL0, and an arc line in which the total of the distances from the points of the land portion edges to the arc line is minimized is preferably set as the reference profile line PL0.

A bulging profile line PL1 projects to the outer side in the tire radial direction with respect to the reference profile line PL0 while passing through the points of the land portion edges of the land portion of the center land portion region 46, the land portion of the first middle land portion region 44, and the land portion of the second middle land portion region 48.

By providing the bulging profile line PL1 in this way, the ground contact pressure of the central portions in the tire width direction of the center land portion region 46, the first middle land portion region 44, and the second middle land portion region 48 can be effectively increased, and the ground contact pressure can be shifted in a direction in which the distribution of the ground contact pressure is uniform. Due to this, the edge effect of the sipes 71 and 72 provided in the center land portion region 46, the first middle land portion region 44, and the second middle land portion region 48 can be efficiently enhanced. Therefore, the on-snow performance can be improved.

The maximum projection amount of the bulging profile line PL1 with respect to the reference profile line PL0 is preferably 0.1 to 1.0 mm, for example.

According to one embodiment, it is preferable that the ratio (groove area ratio) of the area of the circumferential groove and the lug groove to the ground contact surface of the tread portion 10T is 25 to 30%, the ratio (main groove area ratio) of the area of the circumferential groove to the ground contact surface of the tread portion 10T is 16 to 22%, and the snow traction index STI is 115 to 140. The ground contact surface is a ground contact surface when the tire 10 is brought into contact with a horizontal surface under the condition that the tire is assembled on a regular rim, inflated with a regular internal pressure, and loaded with 88% of the regular load. "Regular rim" refers to a "measurement rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). "Regular internal pressure" refers to "maximum air pressure" defined by JATMA, a maximum value in "TIRE LOAD LIMITS AT VARIOUS COLD INFLATION PRESSURES" defined by TRA, or "INFLATION PRES- SURES" defined by ETRTO. "Regular load" refers to a "maximum load capacity" defined by JATMA, a maximum value in "TIRE LOAD LIMITS AT VARIOUS COLD INFLATION PRESSURES" defined by TRA, or "LOAD CAPACITY" defined by ETRTO.

STI is represented by Formula (1):

$$STI = -6.8 + 2202 \cdot \rho_g + 672 \cdot \rho s + 7.6 \cdot D_g \quad (1)$$

(In Formula (1), $\rho_g$ is a value obtained by dividing the total length (mm) of the lengths in the tire width direction of all the lug grooves provided in the land portion region when the lug grooves are projected in the tire circumferential direction by (ground contact width of land portion region)×(circumferential length of land portion region) (mm$^2$), $\rho s$ is a value obtained by dividing the total length (mm) of the lengths in the tire width direction of all the sipes provided in the land portion region when the sipes are projected in the tire circumferential direction by (ground contact width of land portion region)×(circumferential length of land portion region) (mm$^2$), and $D_g$ is an average depth (mm) of the lug grooves provided in the land portion region). STI is a well-known index and is described in, for example, JP 2824675 B.

The circumferential grooves for calculating the groove area ratio and the main groove area ratio include the main grooves 32, 34, 36, and 38 and the narrow grooves 31 and 39. The groove area ratio in the above range is smaller than the groove area ratio of a general winter tire, and the noise performance of the tire 10 is favorable. When the groove area ratio, the main groove area ratio, and the STI satisfy the above ranges, the effect of improving the noise performance is effectively obtained while at least maintaining the on-snow performance.

The groove area ratio is preferably 26 to 29%. The main groove area ratio is preferably 17 to 21%. The STI is preferably 120 to 135.

According to one embodiment, the second sipes 72 are preferably disposed at pitch intervals of the land portion regions 43, 46, 48, and 49. Since the second sipe 72 is disposed at each pitch length in the sipe region 70 having no lug groove, the steering stability close to that when a lug groove is provided in place of the second sipe 72 is obtained.

According to one embodiment, the ends in the extension direction of the second sipe 72 and the first sipe 71 are preferably connected (communicated) with the circumferential groove or the lug groove. Due to this, the edge effect due to the second sipe 72; and the edge effect due to the first sipe 71 due to the suppression of the movement of a portion of the land portion between the second sipes 72 are effectively obtained, and the on-snow performance can be effectively supplemented. Since such a form has little influence on the pattern noise, the noise performance is favorable.

According to one embodiment, the number of first sipes 71 between the second sipes 72 adjacent in the tire circumferential direction is preferably 1 to 4, and more preferably 1 or 2. According to one embodiment, the sipe region 70 preferably does not include a first sipe that is not adjacent to the second sipe 72 in the tire circumferential direction. That is, it is preferable that all the first sipes 71 in the sipe region 70 are adjacent to the second sipe 72 in the tire circumferential direction. The above effect of suppressing the movement of the block that contracts when it touches the ground is easily obtained, and the edge effect of both the first sipe 71 and the second sipe 72 can be efficiently obtained. Further, according to one embodiment, the number of first sipes 71 adjacent in the tire circumferential direction between the second sipes 72 adjacent in the tire circumferential direction is preferably different, and in the example illustrated in FIG. 2, one and two of the first sipes 71 are disposed alternately in the tire circumferential direction. In this case, as for the interval of the sipes adjacent in the tire circumferential direction, the interval of the smaller number of first sipes 71 between the second sipes 72 adjacent in the tire circumferential direction is preferably wider than the interval of the larger number of first sipes 71.

According to one embodiment, the sipe region 70 may be provided in all land portion regions of the tread pattern. However, as described above, it is preferable that the sipe region 70 is provided in some of the land portion regions so that a lug groove is provided in some of the land portion regions to obtain on-snow performance due to the snow column shear force.

COMPARATIVE EXAMPLES AND EXAMPLES

To examine the effects of the pneumatic tire of the present embodiment, the tread pattern of the tire was variously changed, and the on-snow performance and the noise performance were examined. The prototype tires each had a tire size of 235/60R18 and the cross-sectional shape illustrated in FIG. 1, and were based on the tread pattern illustrated in FIG. 2, except for configurations indicated in Table 1 and Table 2 and configurations described below.

In Table 1 and Table 2, "first sipe width" indicates the sipe width of the first sipe, and "second sipe width" indicates the sipe width of the second sipe. Within an identical land portion region, the sipe depths in the central regions of the first sipe and the second sipe were equal.

"Communicating" indicates that the shoulder lug grooves 52 and 58 extend through the narrow grooves 31 and 39 and are connected to the main grooves 32 and 38, and "Not communicating" indicates that as illustrated in FIG. 2, the shoulder lug grooves 52 and 58 terminate by being connected to the narrow grooves 31 and 39 and do not communicate with the main grooves 32 and 38.

"Sh side" means the shoulder side (outer side in the tire width direction), and "Ce side" means the tire centerline side.

In Comparative Example 1, in the center land portion region, the second sipe of FIG. 2 was replaced with a lug groove having a closed end that is connected to the main groove 36 and is not connected to the main groove 34 and a first sipe that extends from a closed end of the lug groove and is connected to the main groove 34.

In Comparative Examples 1 and 2 and Examples 1 to 6, in the second middle land portion region (fourth land portion region), the second sipe and the second lug groove illustrated in FIG. 2 were replaced with a first sipe. Further, in Comparative Examples 1 and 2 and Examples 1 to 4, the raised bottom portion was not provided in the first lug groove. The groove depth of the first lug groove was set to a groove depth having a size between the groove depth of the raised bottom portion of Examples 5 to 8 and the groove depth of the region of the first lug groove different from the raised bottom portion.

In Comparative Example 2, the lug groove in the center land portion region in Comparative Example 1 was replaced with the first sipe.

In Example 1, in the center land portion region in Comparative Example 2, the first sipe provided at the position of the second sipe in FIG. 2 was replaced with the second sipe.

In Comparative Examples 1 and 2 and Examples 1 and 2, in the narrow land portion region, a shoulder lug groove was disposed in place of the second sipe illustrated in FIG. 2.

Examples 2 to 8 were identical to those of Example 1 except for the points illustrated in Table 1 and Table 2.

In Example 7, the second middle land portion region in Example 6 was provided with: a second lug groove that communicates with the main groove on the "Ce side" and does not communicate with the main groove on the "Sh side"; and a second sipe that extends from a closed end of the second lug groove and is connected to the main groove on the "Sh side". That is, in Example 7, in the second middle land portion region, the positions of the sipe region and the second lug groove in the tire width direction illustrated in FIG. 2 were exchanged.

The sipe width of the first sipe is 0.6 mm, excluding those illustrated in Table 1 and Table 2. The sipe width of the second sipe in the second middle land portion region was 1.0 mm, except for those illustrated in Table 1 and Table 2.

The sipe depth of the second sipe in the narrow land portion region was constant.

In Example 8, the groove area ratio was 27%, the main groove area ratio was 19%, and the STI was 133.

The on-snow performance and the noise performance of these test tires were evaluated according to the following test methods, and the results are illustrated in Table 1. For the evaluations, the test tires were assembled on wheels having a rim size of 18×7.5 J, mounted on a front wheel drive vehicle of 2400 cc engine displacement, and the air pressure after warm-up was set to 230 kPa. The vehicle mounting orientation of the test tires was as illustrated in FIG. 2.

On-Snow Performance When New

Sensory evaluation was performed for steering characteristics, straightness, and the like when a test driver traveled in the range of 0 to 80 km/hour on a test course of a snow-covered road surface. The results were expressed as index values with Comparative Example 1 being assigned the value of 100. The larger index values mean excellent on-snow performance when new.

On-Snow Performance When Worn

Tires in which the average wear amount of the four main grooves on the four wheels was 50% of a predetermined maximum wear depth were mounted on the vehicle, and sensory evaluation was performed in an identical manner to the on-snow performance when new. The results were expressed as index values with Comparative Example 1 being assigned the value of 100. The larger index values mean excellent on-snow performance when worn. The average wear amount is the average value of the amount of wear measured at a plurality of points in the circumferential direction for each main groove.

Noise Performance

As an evaluation of noise performance, new tires similar to the on-snow performance when new were mounted on a vehicle, and sensory evaluation of tire noise was performed by a test driver on dry road surfaces at a running speed of 40 km/hr to 120 km/hr. The results were expressed as index values with Comparative Example 1 being assigned the value of 100. Larger index values mean excellent noise performance.

The case where the total of the index values of on-snow performance when new and the on-snow performance when worn is 200 or more and where the noise performance index exceeds 100 was evaluated that the noise performance can be improved while at least maintaining the on-snow performance.

TABLE 1

|  | Comparative Example 1 | Comparative Example 2 |
| --- | --- | --- |
| Presence of lug grooves in center land portion | Yes | No |
| First sipe width in center land portion (mm) | 0.6 | 0.6 |
| Second sipe width in center land portion (mm) | — | — |
| Raised bottom depth of first sipe in center land portion (mm) | 3.0 | 3.0 |
| Raised bottom depth of second sipe in center land portion (mm) | 3.0 | 3.0 |
| Shoulder lug groove communicating with main groove | Communicating | Communicating |
| Second sipe width in narrow land portion (mm) | — | — |
| Position of raised bottom portion of first lug groove | — | — |
| Main groove communicating with second lug groove | — | — |
| On-snow performance when new | 100 | 97 |
| On-snow performance when worn | 100 | 100 |
| Noise performance | 100 | 103 |

|  | Example 1 | Example 2 | Example 3 |
| --- | --- | --- | --- |
| Presence of lug grooves in center land portion | No | No | No |
| First sipe width in center land portion (mm) | 0.6 | 0.6 | 0.6 |
| Second sipe width in center land portion (mm) | 1.0 | 1.0 | 1.0 |
| Raised bottom depth of first sipe in center land portion (mm) | 3.0 | 3.0 | 3.0 |
| Raised bottom depth of second sipe in center land portion (mm) | 3.0 | 4.0 | 4.0 |

TABLE 1-continued

| | | | |
|---|---|---|---|
| Shoulder lug groove communicating with main groove | Communicating | Communicating | Not communicating |
| Second sipe width in narrow land portion (mm) | — | — | 0.8 |
| Position of raised bottom portion of first lug groove | — | — | — |
| Main groove communicating with second lug groove | — | — | — |
| On-snow performance when new | 100 | 100 | 97 |
| On-snow performance when worn | 100 | 103 | 103 |
| Noise performance | 103 | 103 | 105 |

TABLE 2

| | Example 4 | Example 5 | Example 6 |
|---|---|---|---|
| Presence of lug grooves in center land portion | No | No | No |
| First sipe width in center land portion (mm) | 0.6 | 0.6 | 0.6 |
| Second sipe width in center land portion (mm) | 1.0 | 1.0 | 1.0 |
| Raised bottom depth of first sipe in center land portion (mm) | 3.0 | 3.0 | 3.0 |
| Raised bottom depth of second sipe in center land portion (mm) | 4.0 | 4.0 | 4.0 |
| Shoulder lug groove communicating with main groove | Not communicating | Not communicating | Not communicating |
| Second sipe width in narrow land portion (mm) | 1.0 | 1.0 | 1.0 |
| Position of raised bottom portion in first lug groove | — | Ce side | Sh side |
| Main groove communicating with second lug groove | — | — | — |
| On-snow performance when new | 100 | 100 | 100 |
| On-snow performance when worn | 103 | 103 | 103 |
| Noise performance | 105 | 105 | 107 |

| | Example 7 | Example 8 |
|---|---|---|
| Presence of lug grooves in center land portion | No | No |
| First sipe width in center land portion (mm) | 0.6 | 0.6 |
| Second sipe width in center land portion (mm) | 1.0 | 1.0 |
| Raised bottom depth of first sipe in center land portion (mm) | 3.0 | 3.0 |
| Raised bottom depth of second sipe in center land portion (mm) | 4.0 | 4.0 |
| Shoulder lug groove communicating with main groove | Not communicating | Not communicating |
| Second sipe width in narrow land portion (mm) | 1.0 | 1.0 |
| Position of raised bottom portion in first lug groove | Sh side | Sh side |
| Main groove communicating with second lug groove | Ce side | Sh side |
| On-snow performance when new | 102 | 103 |
| On-snow performance when worn | 105 | 106 |
| Noise performance | 105 | 106 |

From the comparison between Examples 1 to 8 and Comparative Examples 1 and 2, it can be seen that the noise performance can be improved while at least maintaining the on-snow performance, when at least one land portion region includes a sipe region.

From the comparison between Example 1 and Example 2, it can be seen that the on-snow performance when worn is improved, when the depth of the raised bottom portion of the second sipe is deeper than the depth of the raised bottom portion of the first sipe.

From the comparison between Example 2 and Example 3, it can be seen that the noise performance can be improved while maintaining the on-snow performance, when the narrow land portion region includes the sipe region.

From the comparison between Example 3 and Example 4, it can be seen that the on-snow performance when new is improved, when the ratio of the sipe width of the second sipe 72 to the sipe width of the first sipe 71 is 1.4 to 3.0.

From the comparison between Example 5 and Example 6, it can be seen that the noise performance is improved, when the raised bottom portion of the first lug groove is located on the shoulder side (main groove 32 side).

From the comparison between Example 6 and Example 7, it can be seen that the on-snow performance when new and the on-snow performance when worn are improved, when the second middle land portion region includes a sipe region and when a second lug groove connected to the second sipe in the sipe region is provided.

From the comparison between Example 7 and Example 8, it can be seen that the on-snow performance when new is improved and the noise performance is improved, when the second lug groove communicates with the main groove 38 on the shoulder side.

The pneumatic tire according to an embodiment of the present technology is described above in detail. However, the pneumatic tire according to an embodiment of the present technology is not limited to the above-described embodiments or examples and may of course be enhanced or modified in various ways without departing from the scope of the present technology. The above-mentioned features of the pneumatic tire of the present technology can be applied to tires other than pneumatic tires such as solid tires and run-flat tires.

The invention claimed is:

1. A pneumatic tire comprising a tread pattern in a tread portion,
the tread pattern comprising:
a plurality of circumferential grooves extending in a tire circumferential direction; and
a plurality of sipes disposed at intervals in the tire circumferential direction in each of a plurality of land portion regions in contact with the circumferential grooves, the sipes extending in a tire width direction,
at least one of the land portion regions comprising a sipe region comprising a first sipe and a second sipe disposed to be adjacent to the first sipe in the tire circumferential direction as the sipes, the sipe region being provided in at least a partial region in the tire width direction,
a sipe width of the second sipe being wider than a sipe width of the first sipe,
the sipe region being not provided with a lug groove having a wider groove width than the sipe width of the second sipe, the lug groove extending in the tire width direction,
among the land portion regions, a first land portion region sandwiched between two circumferential grooves adjacent in the tire width direction comprising the sipe region,
each of all the sipes in the sipe region being connected to the two circumferential grooves,
each of the sipes in the sipe region of the first land portion region comprises a raised bottom portion having a shallower sipe depth than a sipe depth in a central region of the sipes between connection regions, the raised bottom portion being provided in each of the connection regions of the sipes extending in an extension direction of the sipes from a connection end connected to the circumferential groove connected to the sipes, and
a depth of the raised bottom portion of the second sipe is deeper than a depth of the raised bottom portion of the first sipe.

2. The pneumatic tire according to claim 1, wherein
at least one of two second land portion regions sandwiched between two outer circumferential grooves disposed on an outer side in the tire width direction of the two circumferential grooves sandwiching the first land portion region among the plurality of circumferential grooves and two inner circumferential grooves disposed to be adjacent to the outer circumferential grooves in the tire width direction on an inner side in the tire width direction of the outer circumferential grooves comprises the sipe region, and
the sipes in the sipe region are connected to one of the outer circumferential grooves or one of the inner circumferential grooves.

3. A pneumatic tire comprising a tread pattern in a tread portion,
the tread pattern comprising:
a plurality of circumferential grooves extending in a tire circumferential direction; and
a plurality of sipes disposed at intervals in the tire circumferential direction in each of a plurality of land portion regions in contact with the circumferential grooves, the sipes extending in a tire width direction,
at least one of the land portion regions comprising a sipe region comprising a first sipe and a second sipe disposed to be adjacent to the first sipe in the tire circumferential direction as the sipes, the sipe region being provided in at least a partial region in the tire width direction,
a sipe width of the second sipe being wider than a sipe width of the first sipe, the sipe region being not provided with a lug groove having a wider groove width than the sipe width of the second sipe, the lug groove extending in the tire width direction, wherein
among the land portion regions, a first land portion region sandwiched between two circumferential grooves adjacent in the tire width direction comprises the sipe region,
each of all the sipe in the sipe region is connected to the two circumferential grooves,
at least one of two second land portion regions sandwiched between two outer circumferential grooves disposed on an outer side in the tire width direction of the two circumferential grooves sandwiching the first land portion region among the plurality of circumferential grooves and two inner circumferential grooves disposed to be adjacent to the outer circumferential grooves in the tire width direction on an inner side in the tire width direction of the outer circumferential grooves comprises the sipe region,
the sipes in the sipe region are connected to one of the outer circumferential grooves or one of the inner circumferential grooves,
the land portion regions further comprise two shoulder land portion regions located on the outer side in the tire width direction of the outer circumferential grooves,
the tread pattern further comprises a plurality of shoulder lug grooves disposed at intervals in the tire circumferential direction in one of the shoulder land portion regions and extending in the tire width direction, and one of the shoulder lug grooves is connected to the second sipe in the sipe region of the second land portion region via one of the outer circumferential grooves.

4. The pneumatic tire according to claim 2, wherein the second sipe in the sipe region of the second land portion region has a constant sipe depth over an extension direction of the second sipe.

5. The pneumatic tire according to claim 2, wherein a groove width of one of the outer circumferential grooves is narrower than a groove width of one of the inner circumferential grooves.

6. The pneumatic tire according to claim 1, wherein a tire centerline passes through the first land portion region,
the tread pattern further comprises a plurality of first lug grooves disposed at intervals in the tire circumferential direction in a third land portion region sandwiched between two circumferential grooves, one of which is different from the two circumferential grooves sandwiching the first land portion region among the plurality of circumferential grooves, the first lug grooves extending in the tire width direction,
the first lug grooves each bend at two points so as to project toward both sides in the tire circumferential direction while the first lug grooves extend, and
an arrangement position of a portion of each of the first lug grooves between two bending positions is close to a circumferential groove located farthest from the tire centerline among the two circumferential grooves sandwiching the third land portion region.

7. The pneumatic tire according to claim 6, wherein the first lug grooves each comprise a raised bottom portion having a shallower groove depth than a region of the first lug grooves different from a connection region of the first lug grooves, the raised bottom portion being provided in the connection region of the first lug grooves extending in an extension direction of the first lug grooves from a connection end connected to a circumferential groove located farthest from the tire centerline among the two circumferential grooves sandwiching the third land portion region.

8. The pneumatic tire according to claim 6, wherein the tread pattern specifies a vehicle mounting orientation, and
the third land portion region is disposed in a half-tread region facing a vehicle outer side among half-tread regions on both side in the tire width direction with respect to the tire centerline.

9. The pneumatic tire according to claim 1, wherein a tire centerline passes through the first land portion region,
a fourth land portion region sandwiched between two circumferential grooves, one circumferential groove of which is different from the two circumferential grooves sandwiching the first land portion region among the plurality of circumferential grooves, comprises the sipe region,
the fourth land portion region comprises the sipe region in a region in the tire width direction in contact with one of the two circumferential grooves,
the tread pattern further comprises a plurality of second lug grooves disposed at intervals in the tire circumferential direction, the second lug grooves extending from a circumferential groove different from the one circumferential groove among the two circumferential grooves toward inside the fourth land portion region in the tire width direction, the second lug grooves being closed on an outer side of the sipe region,
a closed end of one of the second lug grooves is connected to the second sipe in the sipe region, and
the second sipe has a constant sipe depth over an extension direction of the second sipe.

10. A pneumatic tire comprising a tread pattern in a tread portion,
the tread pattern comprising:
a plurality of circumferential grooves extending in a tire circumferential direction; and
a plurality of sipes disposed at intervals in the tire circumferential direction in each of a plurality of land portion regions in contact with the circumferential grooves, the sipes extending in a tire width direction,
at least one of the land portion regions comprising a sipe region comprising a first sipe and a second sipe disposed to be adjacent to the first sipe in the tire circumferential direction as the sipes, the sipe region being provided in at least a partial region in the tire width direction,
a sipe width of the second sipe being wider than a sipe width of the first sipe, the sipe region being not provided with a lug groove having a wider groove width than the sipe width of the second sipe, the lug groove extending in the tire width direction, wherein
among the land portion regions, a first land portion region sandwiched between two circumferential grooves adjacent in the tire width direction comprises the sipe region,
each of all the sipe in the sipe region is connected to the two circumferential grooves,
a tire centerline passes through the first land portion region,
a fourth land portion region sandwiched between two circumferential grooves, one circumferential groove of which is different from the two circumferential grooves sandwiching the first land portion region among the plurality of circumferential grooves, comprises the sipe region,
the fourth land portion region comprises the sipe region in a region in the tire width direction in contact with one of the two circumferential grooves,
the tread pattern further comprises a plurality of second lug grooves disposed at intervals in the tire circumferential direction, the second lug grooves extending from a circumferential groove different from the one circumferential groove among the two circumferential grooves toward inside the fourth land portion region in the tire width direction, the second lug grooves being closed on an outer side of the sipe region,
a closed end of one of the second lug grooves is connected to the second sipe in the sipe region,
the second sipe has a constant sipe depth over an extension direction of the second sipe,
the tread pattern specifies a vehicle mounting orientation, and
the fourth land portion region is disposed in a half-tread region facing a vehicle inner side among half-tread regions on both sides in the tire width direction with respect to the tire centerline.

11. The pneumatic tire according to claim 1, wherein the land portion regions comprise the first land portion region sandwiched between two circumferential grooves adjacent in the tire width direction among the plurality of circumferential grooves, a third land portion region sandwiched between two circumferential grooves, one of which is different from the two circumferential grooves, and a fourth land portion region sandwiched between two circumferential grooves, one of which is different from the two circumferential grooves sandwiching the first land portion region, the two circumferential grooves different from the two circumferential grooves sandwiching the third land portion region, and in a profile cross-section of the tread portion along the tire width direction, when a reference profile line is an arc which passes through points of two land portion edges at which a tread surface of a land portion of the first land portion region is respectively connected to groove wall surfaces of the two circumferential grooves sandwiching the first land portion region and points of two land portion edges at which tread surfaces of a land portion of the third land portion region and a land portion of the fourth land portion region are respectively connected to groove wall surfaces of the two circumferential grooves, and in which a center point is located on a tire centerline, a profile line created by the tread surfaces of the land portion of the first land portion region, the land portion of the third land portion region, and the land portion of the fourth land portion region is a bulging profile line that projects to an outer side in a tire radial direction with respect to the reference profile line.

12. The pneumatic tire according to claim 1, wherein at least one of the land portion regions comprises a plurality of lug grooves disposed at intervals in the tire circumferential direction and extending in the tire width direction, a ratio of an area of one of the circumferential grooves and the lug grooves to a ground contact surface of the tread portion is 25 to 30%, a ratio of an area of the circumferential grooves to the ground contact surface of the tread portion is 16 to 22%, and a snow traction index STI is 115 to 140, STI being represented by Formula (1):

$$STI = -6.8 + 2202 \cdot \rho_g + 672 \cdot \rho_s + 7.6 \cdot D_g \qquad (1)$$

(in Formula (1), $\rho_g$ is a value obtained by dividing a total length (mm) of lengths in the tire width direction of all the lug grooves provided in the land portion regions when the lug grooves are projected in the tire circumferential direction by (ground contact width of the land portion regions)×(circumferential length of the land portion regions) (mm²), $\rho_s$ is a value obtained by dividing a total length (mm) of lengths in the tire width direction of all the sipes provided in the land portion region when the sipes are projected in the tire circumferential direction by (ground contact width of the land portion regions)×(circumferential length of the land portion regions) (mm²), and Dg is an average depth (mm) of the lug grooves provided in the land portion regions).

13. The pneumatic tire according to claim 1, wherein a ratio of a sipe width of the second sipe to a sipe width of the first sipe is 1.4 or more.

14. The pneumatic tire according to claim 1, wherein the sipe region does not comprise the first sipe that is not adjacent to the second sipe in the tire circumferential direction.

* * * * *